United States Patent [19]
Myers, Jr. et al.
[11] 4,288,511
[45] Sep. 8, 1981

[54] PHOTOGRAPHIC ELEMENTS CONTAINING ENCAPSULATED POLYMERS COORDINATED WITH METAL IONS

[75] Inventors: Drewfus Y. Myers, Jr., Pittsford; George H. Hawks, III, Penfield, both of N.Y.

[73] Assignee: Eastman Kodak Company, Rochester, N.Y.

[21] Appl. No.: 144,808

[22] Filed: Apr. 29, 1980

Related U.S. Application Data

[62] Division of Ser. No. 22,676, Mar. 22, 1979.

[51] Int. Cl.[3] ........................ G03C 1/40; G03C 1/10; G03C 5/54; C08K 9/00

[52] U.S. Cl. ........................................ 430/17; 430/18; 430/213; 430/941; 260/37 M; 260/42.14; 260/145 R; 525/50; 525/902; 525/336; 525/360; 525/370; 525/371; 525/374

[58] Field of Search .................. 430/213, 17, 18, 627, 430/496, 630, 941; 526/23, 47, 48.1, 48.2, 49; 260/37 M, 42, 14, 145 R; 8/4, 30, 42 R, 79; 106/308 Q; 428/407, 402, 457, 500, 522, 327, 328; 525/902, 50

[56] References Cited

U.S. PATENT DOCUMENTS 3,773,509 11/1973 Ohyama et al. .................... 430/213
3,958,995 5/1976 Campbell et al. .................. 430/213
4,193,796 3/1980 Campbell et al. .................. 430/941

*Primary Examiner*—Richard L. Schilling
*Attorney, Agent, or Firm*—Arthur H. Rosenstein

[57] ABSTRACT

A photographic element comprises a support having thereon a layer containing a hydrophilic vehicle having dispersed therein a particulate polymeric material encapsulated with a chelating or already chelated polymer, said element, when the polymer is not already chelated, comprising a source of metal ions. The elements are useful in diffusion transfer processes, and particularly useful with chelating acid dyes or dye-forming materials to provide a metallized dye image.

9 Claims, No Drawings

PHOTOGRAPHIC ELEMENTS CONTAINING ENCAPSULATED POLYMERS COORDINATED WITH METAL IONS

This is a division of application Ser. No. 022,676, filed Mar. 22, 1979.

The present invention relates to novel photographic elements containing polymers which coordinate with metal ions to form complexes.

The use of various dyes and dye-forming materials in photographic processes, and particularly in image-transfer processes, has been known for quite some time. In many cases, however, dye image stability has been a problem in that the dyes may tend to wander from the image-receiving layer after processing; be destroyed in dark reactions; or fade, due to light exposure over a period of time.

The use of metal complexes of some ortho substituted azo dyes in image transfer processes reduces fade, as these metallized dyes have been found to be extremely light resistant.

Premetallized dyes are described in U.S. Pat. Nos. 3,081,167 and 3,196,014, and British Pat. Nos. 905,701 and 1,121,995, wherein premetallized dye developers are coated in the image-forming element of an image transfer film unit and release metallized dyes as a function of exposure. On development, these premetallized dyes then diffuse to an image-receiving layer. In some instances, a metallic salt can be in a receiving layer and the dye or dye-forming material can be metallizable, rather than premetallized. That is, the dye or dye-forming material contains groups which will chelate with the metal ions to form the metallized dyes in the receiver.

It has been found that the metallizable dye approach has the advantages of faster diffusion, in some cases, and the ability to use the metallization as a dye hue shifting mechanism. The use of the metallizable dye or dye former, however, requires the use of a metallizing image-receiving layer. In many instances, coating the metal ions in the receiving layer results in metal ion wandering, which causes deleterious sensitometric effects in the light-sensitive emulsion layer and an increase in access time in image transfer processes due to premature metallization. Further, since the metal ion source would be located in the image-receiving layer, unwanted color and stain under basic or acidic conditions may occur.

In copending U.S. application Ser. No. 944,477, filed September 21, 1978 by Archie and Campbell, entitled "Photographic Elements Containing Polymers Which Coordinate with Metal Ions," a film unit is described which comprises a support, a chelating dye or dye-forming material and a mordant-containing receiving layer, said mordant-containing receiving layer having associated therewith a polymer containing groups which form coordination complexes with metal ions and a source of said metal ions associated with the polymer. This reduces the diffusion of metal ions throughout the film unit, and still allows for rapid metallization of the dye or dye-forming material in the vicinity of the mordant.

Generally, using the film units of the above-described Archie and Campbell application, in order to metallize the dye at the receiving layer, the metal must be coated in the same layer in the form of a metal salt or must be complexed with the polymer. In order to avoid the problem of the metal wandering prior to the transfer of dye, as such wandering adversely affects sensitivity, metal salt layers are overcoated with metal binding polymers. This requires two coating steps, however. In addition, many water-soluble polymers containing chelating groups are crosslinked and precipitate on addition of metal ions.

It has been found that a photographic element and particularly a color image transfer unit which comprises a support, a chelating dye or dye-forming material and a mordant receiving layer wherein the receiving layer contains a metal chelating polymer or metal already chelated by polymer (metal-complexed polymer) by the secondary polymerization of a chelating monomer onto a preformed latex or microgel, results in the metal ions being anchored in the receiving layer.

The present invention allows the coating of an aqueous latex to form a metal-containing image-receiving layer in which the metal is strongly bound and shows a reduced tendency to wander into the emulsion layer, where adverse sensitometric effects may occur. This material can be coated as a single layer. Since the material is in the form of a latex or microgel dispersion, there is no crosslinking of polymer chains, as is often observed with chelating solution polymers.

A photographic element in accordance with our invention comprises a support having thereon a layer containing a hydrophilic vehicle having dispersed therein a particulate polymeric material encapsulated with a member of the group consisting of (1) a chelating polymer and a source of metal ions, and (2) a metal chelated with a chelating polymer.

The support for the photographic element can be any support material typically useful for photographic elements, such as those described on page 5 of the November 1976 edition of *Research Disclosure*, the disclosure of which is hereby incorporated by reference.

The particulate polymeric material which is encapsulated in the photographic element can be any latex or microgel. The polymer is in the form of small latex or microgel particles generally less than one micron and preferably from 0.05 to 1 micron. Preferred polymers of this type comprise from about 0.1 to about 6 mole percent of at least one polyvinyl polymerizable monomer, such as divinylbenzene, ethylene glycol dimethacrylate, ethylene glycol diacrylate, divinylphenyl vinyl ethers, substituted alkyl or halo derivatives thereof, such as dimethyl divinylbenzene, chlorodivinylbenzene and the like.

The remainder of the preferred polymers can comprise from 94 to 99.9 mole percent of one or more $\alpha,\beta$-ethylenically unsaturated polymerizable monomers other than those already mentioned. As exemplary of such monomers may be listed: vinyl esters, such as methyl methacrylate, butyl acrylate, butyl methacrylate and ethyl acrylate; amides, such as acrylamide, diacetone acrylamide, N-methyl acrylamide and methacrylamide; nitriles, such as acrylonitrile and vinylbenzylnitrile; ketones, such as methyl vinyl ketone, ethyl vinyl ketone and p-vinylacetophenone; halides, such as vinyl chloride, vinylidene chloride and vinylbenzyl chloride; ethers, such as methyl vinyl ether; ethyl vinyl ether and vinylbenzyl methyl ether; $\alpha,\beta$-unsaturated acids such as acrylic acid, methacrylic acid and vinylbenzoic acid; olefins, such as ethylene, propylene and butylene; diolefins, such as butadiene and 2,3-dimethylbutadiene and the like, and other vinyl monomers within the knowledge and skill of an ordinary worker in the art.

It is particularly preferred that the particulate polymeric material be a mordanting material for dyes, especially acid dyes. In view of the difficulty of coating the polymers and a metal salt in water without ensuing precipitation, mordants of this nature must be coated in a separate layer from the chelating polymer and metal ions to avoid said precipitation. Using the encapsulated polymers according to this invention, these mordants can be encapsulated and coated in one layer with the chelating polymer and metal ions, without resulting in precipitation.

Specifically, in a most preferred embodiment, the particulate polymer contains units according to the formula:

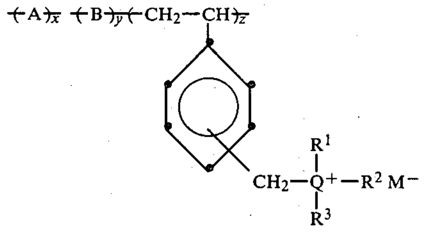

wherein:

A represents units of an addition polymerizable monomer containing at least two ethylenically unsaturated groups;

B represents units of a copolymerizable $\alpha,\beta$-ethylenically unsaturated monomer;

Q is N or P;

$R^1$, $R^2$ and $R^3$ are independently selected from the group consisting of carbocyclic and alkyl groups;

M is an anion;

x is from about 0.25 to about 5 mole percent;

y is from about 0 to about 90 mole percent; and z is from about 10 to about 99 mole percent.

Preferred polymers according to this invention comprise units having the formula above, wherein $R^1$ and $R^2$ are alkyl and $R^3$ is benzyl; and A is a repeating unit of an addition polymerizable monomer containing at least 2 ethylenically unsaturated groups.

U.S. Pat. No. 3,958,955 contains a complete description of these polymeric microgels and methods of preparing them. This method of making the microgel discribed in U.S. Pat. No. 3,958,995 is also applicable to the preparation of any of the latex polymeric microgels according to this invention.

The particulate polymeric material is encapsulated with a chelating polymer and a source of metal ions or a metal chelated with a chelating polymer. The chelating polymer can be any polymeric material which contains groups capable of complexing with metal ions. The chelating group can be any group which will donate a pair of electrons to a metal ion or it could be a salt thereof (e.g., an alkali metal salt, a quaternary ammonium salt, etc) or a hydrolyzable precursor thereof (e.g., a hydrolyzable acyl or ester group), e.g., hydroxy; amino; carboxy; sulfonamido, sulfamoyl; a hydrolyzable ester group having the formula $-OCOR^1$, $-OCOOR^1$, $-OCON(R^1)_2$ or $-COOR^1$, wherein $R^1$ is an alkyl group having 1 to about 4 carbon atoms, such as methyl, ethyl, isopropyl, butyl and the like, or an aryl group having 6 to about 8 carbon atoms, such as phenyl.

Examples of monomers which can be used to encapsulate the microgels and polymerized in situ to form the chelating polymers include $\beta$-diesters having the formula:

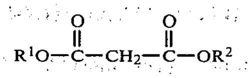

wherein:

$R^1$ and $R^2$ are independently selected from the group consisting of ethylenically unsaturated groups, such as vinyl, allyl, vinylbenzyl, acrylate, acrylamide, methacrylate, methacrylamide, acryloxyalkyl, methacryloxyalkyl, acrylamidoalkyl and methacrylamidoalkyl; alkyl, preferably containing from 1 to 8 carbon atoms, such as methyl, ethyl, isopropyl, butyl, including substituted alkyl, such as chloromethyl and the like; aryl, preferably containing from 6 to 10 carbon atoms, such as phenyl, including substituted aryl, such as bromophenyl and the like; and carbocyclic groups, such as cycloaliphatic, such as cyclohexyl and heterocyclic groups, such as pyridyl, and the like; and wherein at least one of $R^1$ and $R^2$ is an ethylenically unsaturated group;

$\beta$-ketoesters having the formula:

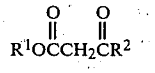

wherein $R^1$ and $R^2$ are as described above;

$\beta$-diketones having the formula:

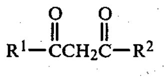

wherein $R^1$ and $R^2$ are as described above;

dicarboxylic acids having the formula:

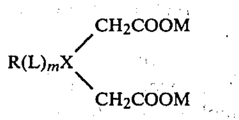

wherein R is an ethylenically unsaturated group as described above; L is a divalent linking group, such as alkylene of about 1 to 10 carbon atoms, e.g., methylene, ethylene, etc, arylene, such as phenylene, arylenealkylene, such as phenylenemethylene and the like; m is 0 or 1; M is hydrogen, an alkali metal or an ammonium cation, such as $NR^4$ wherein $R^4$ is hydrogen, alkyl or aryl and the like; and X is N or CH;

Dinitriles having the formula:

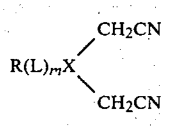

wherein R, L, m and X are as described above;

diamines having the formula:

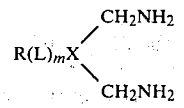

wherein R, L, m and X are as described above;

diamines having the formula:

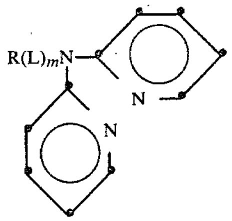

wherein R, L and m are as described above; and phosphites having the formula:

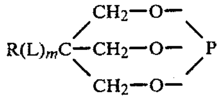

wherein R, L and m are as described above.

A more extensive list of chelating polymers can be found in copending U.S. application Ser. No. 944,477, filed Sept. 21, 1978, entitled "Photographic Elements Containing Polymers Which Coordinate with Metal Ions" by Archie and Campbell.

The particulate polymer can be encapsulated with a preformed chelating polymer, or the latex can be encapsulated by polymerizing a monomer containing reactive pendent groups on the microgel and subsequently reacting with a suitable chelating compound which becomes chemically bound to the reactive polymer.

Preferred chelating materials which can be reacted with polymers containing reactive pendent groups to form chelating polymers include:

(1) Difunctional amines such as 2,2′-dipyridylamine:

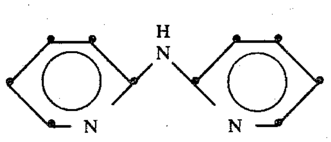

(2) Iminodiacetic acid

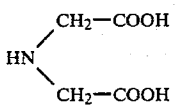

and (3) Iminodiacetonitrile

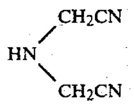

The chelating material may be present in from 5 to 40 percent by weight of the original core material in encapsulated systems, or from 5 to 95 percent by equivalent for materials with reactive pendent groups.

In the case where a preformed chelating polymer is to encapsule the particles, the chelating monomer can be imbibed into the latex or microgel and polymerized by any means of radical initiation to form polymers on the surface of the dispersed particulate polymer.

The particulate polymer can also be encapsulated with the chelating polymer to which a metal has been chelated. These can be prepared by either polymerizing the chelating polymer and subsequently treating the polymer with metal ions or by polymerizing the chelating monomer in situ in the presence of metal ions.

As noted, the metal ions are chelated to the chelating polymer by adding a solution of metal salt to the polymer, or chelating monomer. The solution can be in water. The metal ions chelated with the polymer to form a complex.

Metal ions useful in this invention are those which are essentially colorless when incorporated into the image-receiving element, react speedily with the released dye or dye-forming material to form a complex of the desired hue, and form a dye complex which is stable to heat, light and chemical reagents. In general, good results are obtained with polyvalent metal ions, such as copper(II), zinc(II), nickel(II), platinum(II), palladium(II) and cobalt(II) ions. Most preferred are the transition metal ions, and especially preferred are nickel(II) and copper(II).

The metal ions which are coordinated to the polymer can be derived from any source of metal ions, such as a solution of a salt of the metal ions in water, or a solvent, such as methanol, ethanol, N,N-dimethylformamide and the like. Preferred sources of metal ions are water-soluble salts, such as water-soluble nickel chloride, sulfate, nitrate, and water-soluble copper chloride, sulfate, nitrate and the like.

The term "coordinate to" as used herein refers to materials sharing electron pairs with electrophilic, cationic metal atoms. The stability constant for the complex of a polymer and the metal ion is determined by measuring the concentrations of polymer ligand-metal complex, free polymer ligand, and free metal ion at a pH of about 5 or higher, and by applying the equations:

$$M + L = ML \quad \beta_1 = \frac{[ML]}{[M][L]}$$

$$M + 2L = ML_2 \quad \beta_2 = \frac{[ML_2]}{[M][L]^2}$$

$$M + 3L = ML_3 \quad \beta_3 = \frac{[ML_3]}{[M][L]^3}$$

$$\cdot \quad \cdot \quad \cdot \quad \cdot$$

$$\cdot \quad \cdot \quad \cdot \quad \cdot$$

$$\cdot \quad \cdot \quad \cdot \quad \cdot$$

$$M + NL = ML_N \, \beta_N = \frac{[ML_N]}{[M][L]^N}$$

where M is the concentration of the metal ions, L is the concentration of the polymer ligand, and $\beta$ is the overall stability constant, as described in F. A. Cotton and G. Wilkinson, *Advanced Inorganic Chemistry*, Interscience, New York, 1967. The stability constant for a particular metal ion with a particular polymer containing coordinating groups can be found by quantifying the species mentioned above. In order to be effective, the stability constant of the polymer and metal ion must be at least $10^{15}$, and preferably at least $10^{18}$.

The amount of metal ions used is that which is sufficient to provide each chelating group with about one metal ion.

The encapsulating layer can generally be of any thickness; however, it is preferred that the layer have a thickness of from about 10 A° to about 30 A°.

The encapsulation is performed by merely conventionally polymerizing the chelating monomer or monomer with pendent reactive groups in situ on the particulate microgel. The polymerization can take place with or without a catalyst, such as a potassium persulfate decomposition catalyst, a potassium persulfate-sodium bisulfite redox catalyst system, peroxides, e.g., benzyl peroxide, azo catalysts, e.g., 2,2'-azobis(2-methylpropionitrile), and the like, preferably in a concentration of 0.5 to about 1.5 percent, based on total monomer, and at any temperature and pressure, but preferably at 60° to 90° C., and approximately at atmospheric pressure. The polymerization can be carried out in water.

The hydrophilic vehicle in which the encapsulated polymer is dispersed can be any hydrophilic vehicle, such as gelatin, albumin, polyvinyl alcohol, poly(acrylamide), poly(vinylpyrrolidone), copolymers of acrylamides, vinylpyrrolidones and such synthetic photographic vehicles as are known in the art.

The encapsulated polymer and metal ions (if the polymer is not already chelated with metal) are merely mixed in solution with water and the hydrophilic vehicle to form the layer. The layer is coated on the support by any conventional means.

The resulting coated support can be used in a variety of photographic elements where a dye image is eventually desired. The photographic element preferably contains a dye or dye-forming material which will, on contact with the metallized polymer, coordinate with the metal and polymer to form a stable dye image.

The dye or dye former can be any conventional dye or dye-forming material, such as those described in U.S. Pat. Nos. 4,013,633; 4,001,204 and 3,954,476. In a preferred embodiment, the dye or dye former is a metal chelating dye or dye former.

Generally, any acid dye or dye-forming material containing the above chelating groups will be useful herein as the metallizable dye or dye forming material. Examples of such dyes are those dye developers described in U.S. Pat. Nos. 3,081,167 and 3,196,014, and British Pat. Nos. 905,701 and 1,121,995. Examples of azo dyes useful herein are dihydroxyazo, pyridylhydroxyazo, aminohydroxyazo, pyridylsulfonamidoazo, hydroxyisopyridylazo and the like.

Useful dye-forming materials include redox dye releasers containing dye moieties containing the chelating groups. These dye-forming materials are disclosed in U.S. Pat. No. 4,142,891, issued Mar. 6, 1979 by B. D. Baigrie et al. The nondiffusible compounds having a releasable azo dye moiety generally can have the formula:

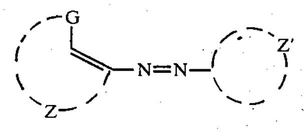

wherein:

Z represents the atoms necessary to complete an aromatic carbocyclic or heterocyclic nucleus having at least one ring of 5 to 7 atoms, such as phenyl, pyridyl, naphthyl, pyrazolyl, indolyl, etc.;

Z' is an aromatic carbocyclic or heterocyclic nucleus having at least one ring having 5 to 7 atoms (e.g., the same nuclei as described above for Z), the Z' having in a position adjacent to the point of attachment to the azo linkage either:

(a) a nitrogen atom in the ring of the nucleus which acts as a chelating site; or (b) a carbon atom in the ring of the nucleus having attached thereto a nitrogen atom, either directly or indirectly such as in a sulfamoyl group, which acts as a chelating site;

G is a metal chelating group (any group which will donate a pair of electrons to a metal ion) or a salt thereof (e.g., an alkali metal salt, a quaternary ammonium salt, etc) or a hydrolyzable precursor thereof (e.g., a hydrolyzable acyl or ester group), e.g., hydroxy; amino; carboxy; sulfonamido; sulfamoyl; a hydrolyzable ester group having the formula $—OCOR^1$, $—OCOOR^1$, $—OCON(R^1)_2$ or $—COOR^1$, wherein $R^1$ is an alkyl group having 1 to about 4 carbon atoms, such as methyl, ethyl, isopropyl, butyl and the like, or an aryl group having 6 to about 8 carbon atoms, such as phenyl, etc; or a group which together with

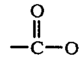

is a ballasted carrier moiety (as defined below) which is attached to the Z-nucleus through the oxygen of the

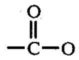 group;

the compound containing a ballasted carrier moiety capable of releasing the diffusible azo dye, under alkaline conditions, such as, for example, as a function (either direct or inverse) of development of the silver halide emulsion layer.

In the above formula, G can be either a monovalent group or a nitrogen atom as part of a heterocyclic ring fused to Z. In this later instance, the Z and G atoms can form a nucleus which is the same as the Z' nucleus.

There is great latitude in selecting a carrier moiety which is attached to the azo dye-releasing compounds described above. Depending upon the nature of the ballasted carrier selected, various groups may be needed to attach or link the carrier moiety to the azo dye. Such linking groups are considered to be a part of the CAR moiety in the definition below. It should also be noted that when the dye moiety is released from the compound, cleavage may take place in such a position that part or all of a linking group if one is present, and even part of the ballasted moiety may be transferred to the image-receiving layer along with the dye moiety. In any event, the azo dye nucleus, as shown above, can be thought of as the "minimum" which is transferred.

CAR moieties according to the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; *Research Disclosure* 14447, April 1976; and U.S. Pat. No.

4,139,379, issued Feb. 13, 1979 of Chasman et al (dye released by miscellaneous mechanisms).

In a further preferred embodiment, the ballasted carrier moiety or CAR as described below may be represented by the following formula:

(Ballast-Carrier-Link)- wherein:

(a) Ballast is an organic ballasting radical of such molecular size and configuration as to render the compound nondiffusible in a photographic element during development in an alkaline processing composition;

(b) Carrier (CAR) is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

$(a)\text{-}(-C{=}C)_b\text{-}$ wherein:

b is a positive integer of 1 to 2; and a represents the radicals OH, SH, NH—, or hydrolyzable precursors thereof; and (c) Link represents a group which upon oxidation of said Carrier moiety is capable of being hydrolytically cleaved to release the diffusible azo dye. For example, Link may be the following groups:

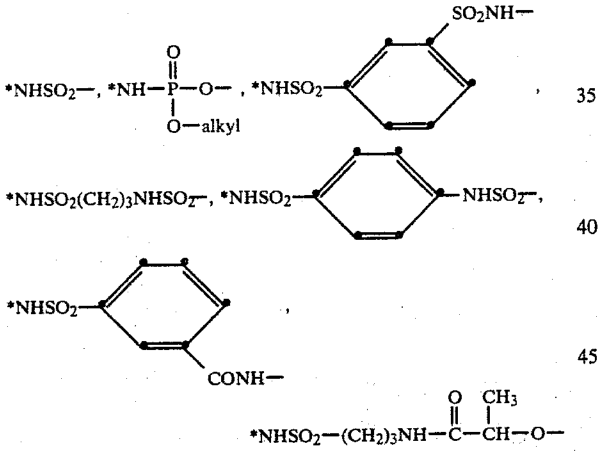

wherein * represents the position of attachment to Carrier.

The Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the carbocyclic or heterocyclic nucleus, etc. Useful Ballast groups generally have at least 8 carbon atoms such as substituted or unsubstituted alkyl groups of 8 to 22 carbon atoms, a carbamoyl radical having 8 to 30 carbon atoms such as $-CONH(CH_2)_4-O-C_6H_3(C_5H_{11})_2$, $-CON(C_{12}H_{25})_2$, etc, a keto radical having 8 to 30 carbon atoms such as $-CO-C_{17}H_{35}$, $-CO-C_6H_4(t-C_{12}H_{25})$, etc.

For specific examples of Ballast-Carrier-Link moieties useful as the CAR moiety according to this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR is a group having the formula:

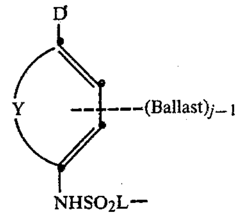

wherein:

(a) Ballast is an organic ballasting radical of such molecular size and configuration (e.g., simple organic groups or polymeric groups) as to render the compound nondiffusible in a photographic element during development in an alkaline processing composition;

(b) D is $OR^2$ or $NHR^3$ wherein $R^2$ is hydrogen or a hydrolyzable moiety and $R^3$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when $R^3$ is an alkyl group of greater than 8 carbon atoms, it can serve as a partial or sole Ballast);

(c) Y represents the atoms necessary to complete a benzene nucleus, a naphthalene nucleus, or a 5- to 7-membered heterocyclic ring, such as pyrazolone, pyrimidine, etc;

(d) j is a positive integer of 1 to 2 and is 2 when D is $OR^2$ or when $R^3$ is hydrogen or an alkyl group of less than 8 carbon atoms; and (e) L is a linking group which is $[X\text{-}(NR^4\text{-}J)_q]_m\text{-}$ or $X\text{-}J\text{-}NR^4\text{-}$ wherein:

(i) X represents a bivalent linking group of the formula $-R^5\text{-}L'_n\text{-}R^5_p\text{-}$ where each $R^5$ can be the same or different and each represents an alkylene radical having 1 to about 8 carbon atoms, such as methylene, hexylene and the like; a phenylene radical; or a substituted phenylene radical having 6 to about 9 carbon atoms, such as methoxyphenylene;

(ii) L' represents a bivalent radical selected from oxy, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

Especially good results are obtained when D is OH, j is 2, Y is a naphthalene nucleus, and G is OH.

Examples of the ballasted CAR moiety in this highly preferred embodiment are disclosed in U.S. Published Patent Application No. B351,673; U.S. Pat. No.

3,928,312; French Pat. No. 2,284,140; and German Pat. Nos. 2,406,664; 2,613,005; and 2,505,248, the disclosures of which are hereby incorporated by reference, and include the following:

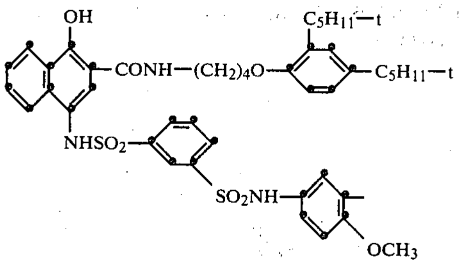

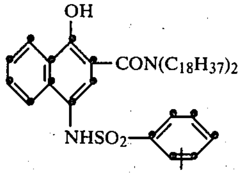

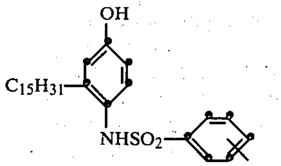

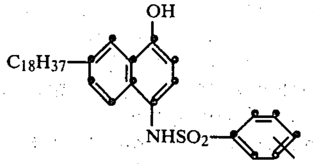

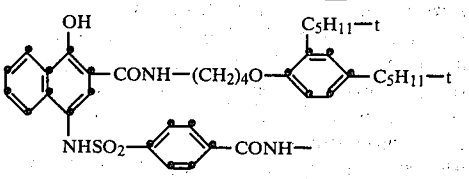

and

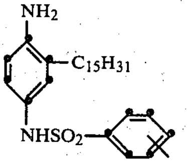

In another highly preferred embodiment, the ballasted carrier moiety or CAR is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

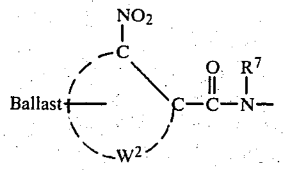

(I)

wherein:

Ballast is an organic ballasting radical of such molecular size and configuration as to render the compound nondiffusible in a photographic element during development in an alkaline processing composition;

$W^2$ represents at least the atoms necessary to complete a benzene nucleus (including various substituents thereon); and $R^7$ is an alkyl (including substituted alkyl) radical having 1 to about 10 carbon atoms.

Examples of the CAR moiety in this formula I include the following:

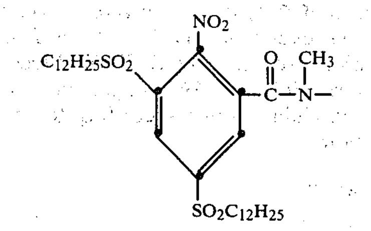

and

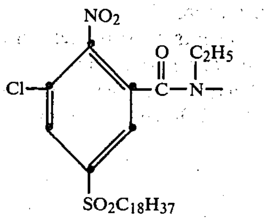

In a second embodiment of positive-working dye-release chemistry as referred to above, the ballasted carrier moiety or CAR may be a group having the formula:

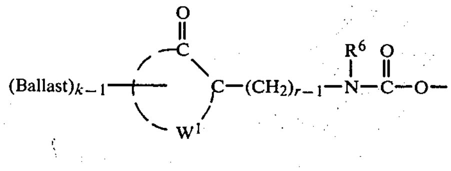

(II)

wherein:

Ballast is an organic ballasting radical of such molecular size and configuration as to render the compound nondiffusible in a photographic element during development in an alkaline processing composition;

$W^1$ represents at least the atoms necessary to complete a quinone nucleus (including various substituents thereon);

r is a positive integer of 1 or 2;

$R^6$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^6$ is a radical of less than 8 carbon atoms.

Examples of the CAR moiety in formula II include the following:

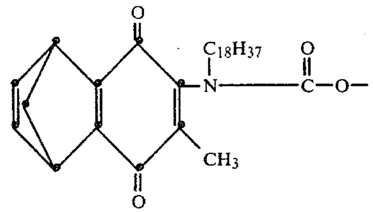

and

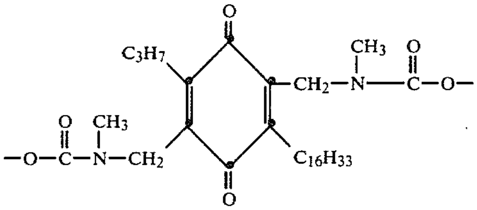

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 issued Feb. 13, 1979.

In a third embodiment of positive-working dye-release chemistry as referred to above, the ballasted carrier moiety or CAR may be a group having the formula:

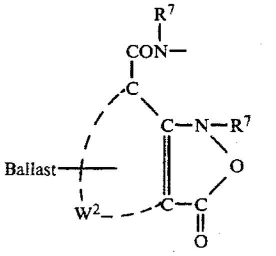

(III)

wherein: Ballast, $W^2$ and $R^7$ are as defined for formula I above.

Examples of the CAR moiety in formula III include the following:

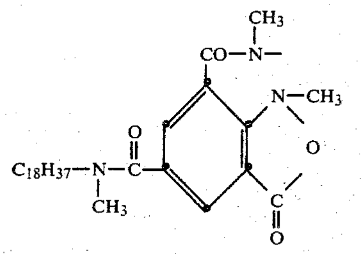

and

-continued

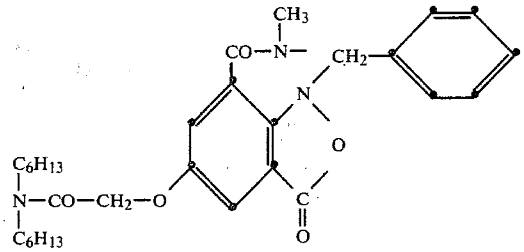

For further details concerning this particular CAR moiety, including synthesis details, reference is made to U.S. application Ser. No. 534,966 of Hinshaw et al, filed Dec. 20, 1974.

In a fourth embodiment of positive-working dye-release chemistry as referred to above, the ballasted carrier moiety or CAR may be a group having the formula:

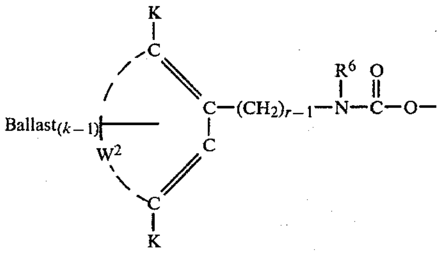

(IV)

wherein:

Ballast, r, $R^6$ and k are as defined for formula II above;

$W^2$ is as defined for formula I above; and

K is OH or a hydrolyzable precursor thereof.

Examples of the CAR moiety in formula IV include the following:

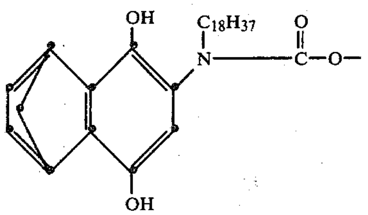

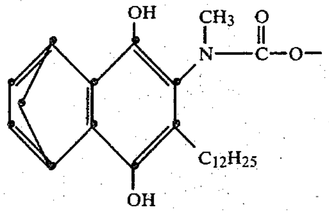

For further details concerning this particular CAR moiety, including synthesis details, reference is made to U.S. Pat. No. 3,980,479 to Fields et al, issued Sept. 14, 1976, the disclosure of which is hereby incorporated by reference.

Representative compounds useful with the polymers of our invention include the following:

(1)
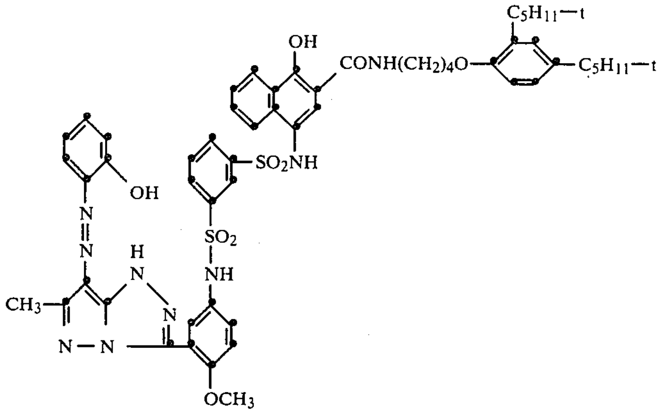
(2)
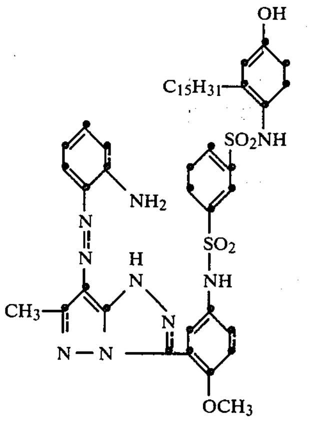
(3)
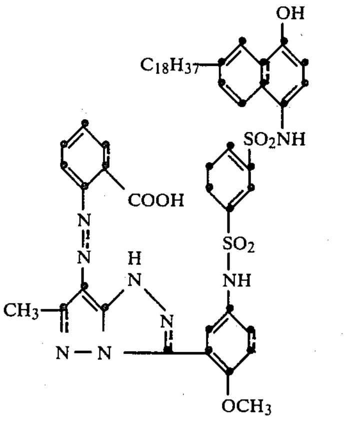
(4)
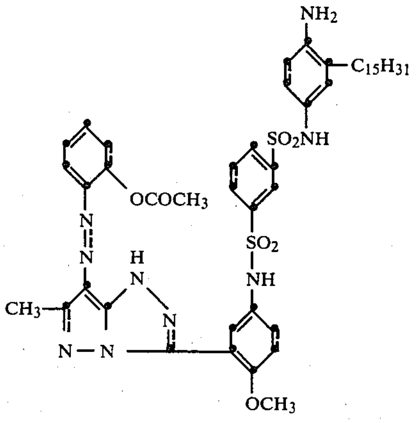
(5)
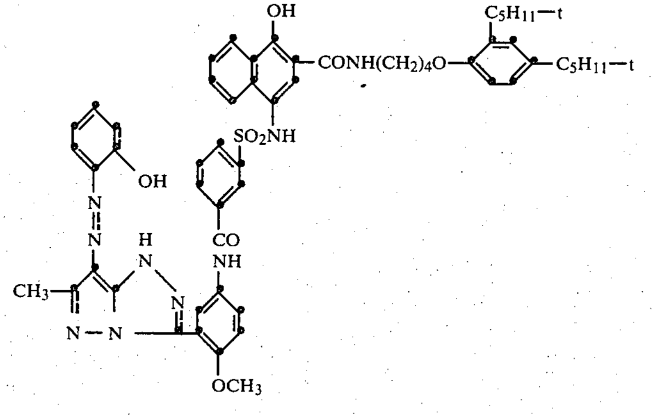

-continued
(6)
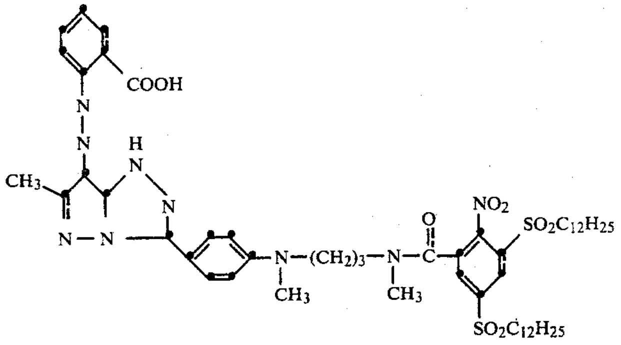
(7)
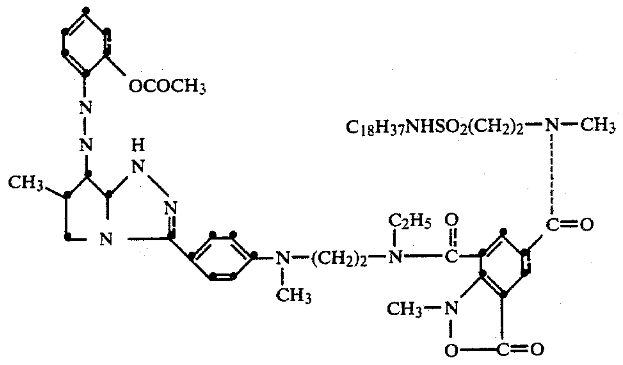
(8)
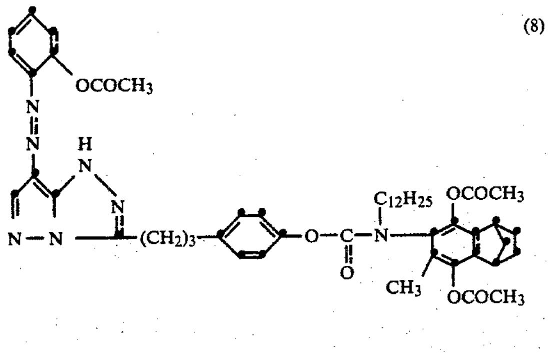
(9)
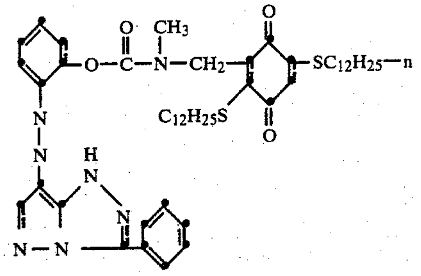
(10)
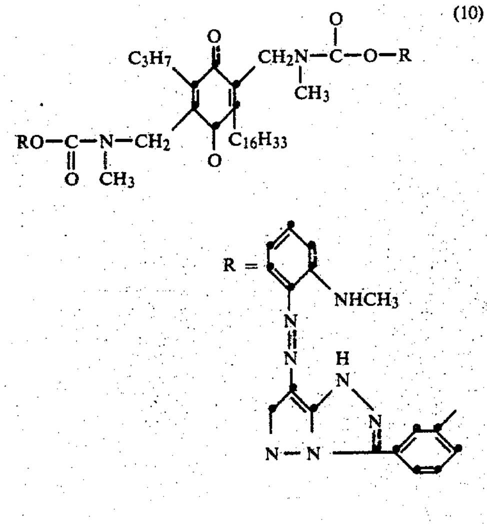
(11)
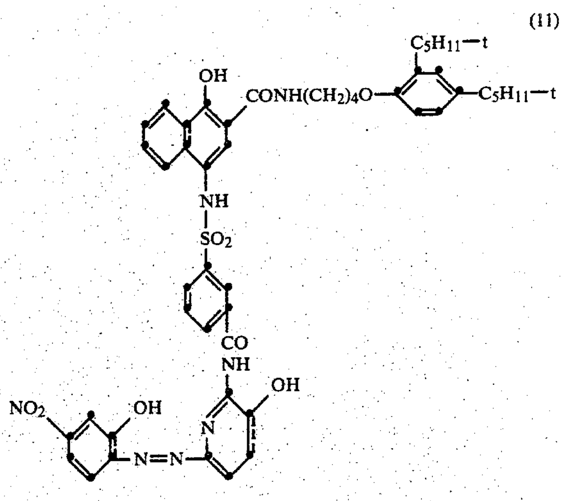

-continued
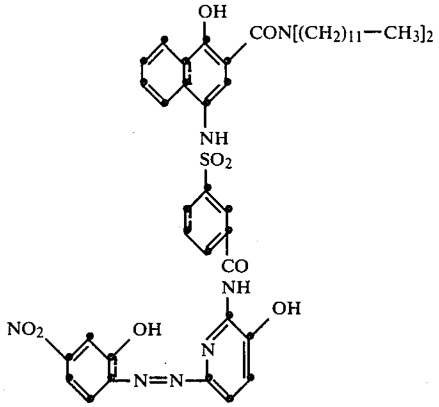
(12)
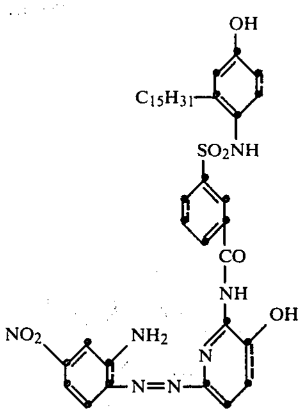
(13)
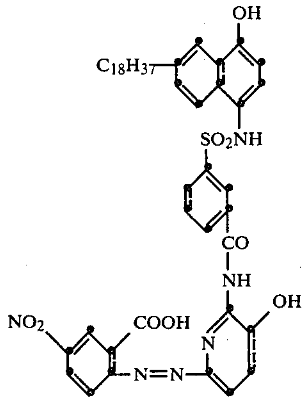
(14)
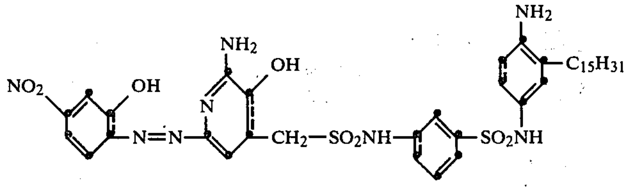
(15)
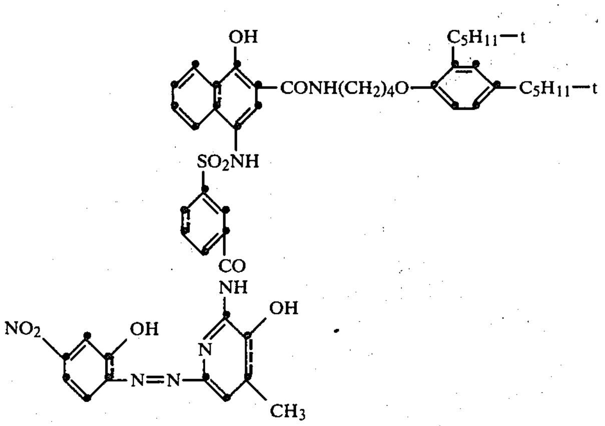
(16)
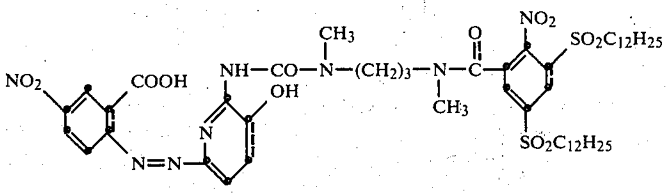
(17)

-continued
(18)
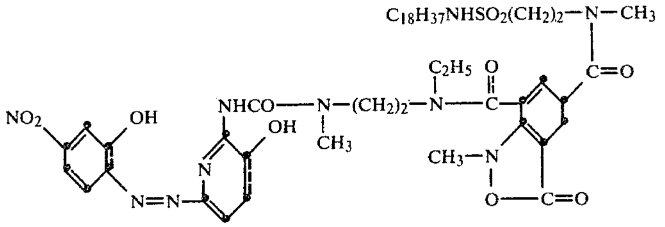
(19)
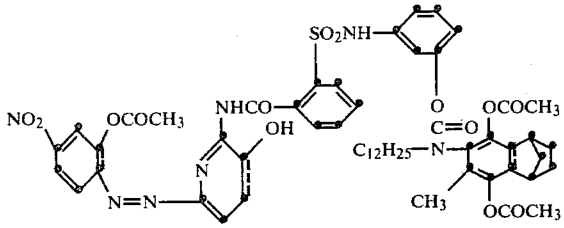
(20)
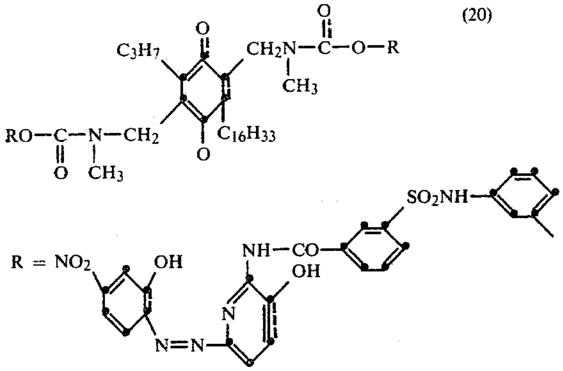
(21)
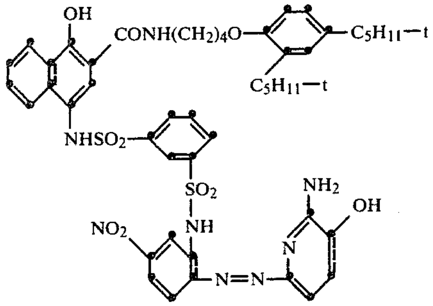
(22)
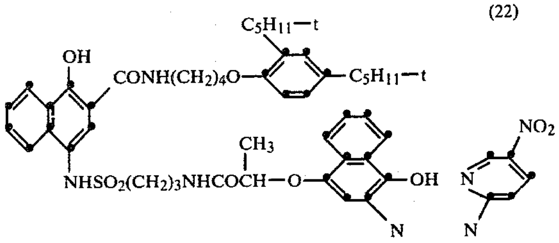
(23)
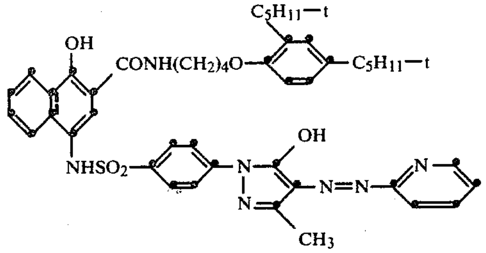
(24)
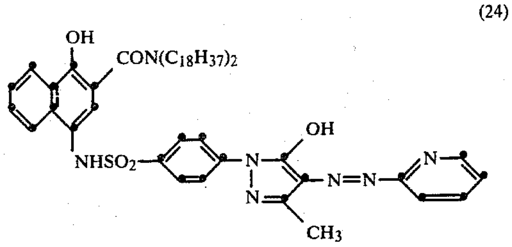
(25)
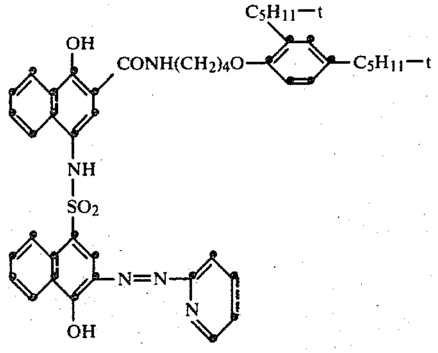
(26)
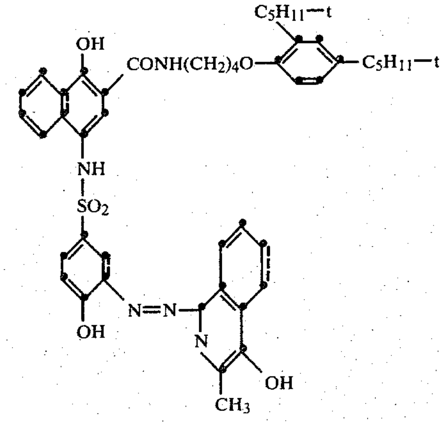
In a preferred embodiment, the photographic element containing the mordant layer, polymer with coordinating groups and metal ions is a dye image receiving element designed for use in an image transfer process.

An image transfer film unit of the invention can thus comprise:

(1) a support containing thereon at least one layer containing a photosensitive silver halide emulsion having associated therewith a dye or dye forming material, preferably a chelating dye or dye forming material;

(2) a dye image receiving layer; and (3) an alkaline processing composition and means for discharging the same within said film unit in contact with said photosensitive layer;

said film unit containing a silver halide developing agent, wherein the dye image-receiving layer contains a hydrophilic vehicle having dispersed therein a particulate latex polymeric material encapsulated with a member of the group consisting of a chelating polymer and a metal chelated with a chelating polymer which complexes with metal ions and, when the metal is not already chelated with the polymer, said image-receiving layer has associated therewith a source of metal ions.

The photographic element in the above-described film unit can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;

(2) a dye image-receiving layer; and (3) means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

It will be appreciated that, after processing the photographic element described above, there remains in it after transfer has taken place an imagewise distribution of chelating dye in addition to developed silver. A color image comprising residual nondiffusible compound may also be obtained by this process if the residual silver and silver halide are removed by any conventional manner well known to those skilled in the photographic art, such as a bleach bath followed by a fix bath, a bleach-fix bath, etc. Such a retained dye image should normally be treated with metal ions to metallize the dyes to increase their light fastness and shift their spectral absorption to the intended region. If a negative-working silver halide emulsion is employed in certain preferred photosensitive elements, described above, then a positive color image, such as a reflection print, a color transparency or motion picture film, may be produced in this manner. If a direct-positive silver halide emulsion is employed in such photosensitive elements, then a negative color image may be produced.

In the film unit described above, the dye image-receiving layer may itself contain metal ions or the metal ions may be present in an adjacent layer, so that the dye or dye forming material which is released will form a coordination complex therewith. The dye thus becomes immobilized in the dye image-receiving layer and metallized at the same time. The formation of the coordination complex may shift the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity. The dyes may also be shifted in a variety of ways well known in the art.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition between the photographic element and an opaque cover sheet as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photo-sensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photo-sensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith. The dye-releaser associated with each silver halide emulsion layer may be contained either in the silver halide emulsion layer itself, or in a layer contiguous to the silver halide emulsion layer.

The concentration of dye-releasing compounds that can be employed in the present invention may be varied over a wide range, depending upon the particular compound employed and the results which are desired. For example, dye-releasers may be coated in layers by using coating solutions containing between about 0.5 and about 8 percent by weight of the dye-releaser distributed in a hydrophilic film-forming natural material or synthetic polymer, such as gelatin, poly(vinyl alcohol), etc, which is adapted to be permeated by aqueous alkaline processing composition.

Depending upon which CAR is used in the dye-releasing compound, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:

N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine, etc.

The non-chromogenic developers in this list are preferred, however, since they avoid any propensity of staining the dye image-receiving layer.

In one of the preferred embodiments of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferrable in alkaline processing composition either by virtue of its self-diffusivity or by having attached to it one or more solubilizing groups, for example, a carboxy, sulpho, sulphonamido, hydroxy or morpholino group.

In using dye-releasing compounds which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure,* the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably providing a pH in excess of 11, and preferably containing a developing agent as described previously. Suitable materials and addenda frequently added to such compositions are disclosed on pages 79 and 80 of the November 1976 edition of *Research Disclosure,* the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure,* page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index,* Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" as used herein has the meaning commonly applied to the term in photography and denotes materials that, for all practical purposes, do not migrate nor wander through organic colloid layers, such as gelatin, in an alkaline medium, in the photographic elements of the invention and preferably when processed in a medium having a pH of 11 or greater. The same meaning is to be attached to the term "immobile". The term "diffusible", as applied to the materials of this invention, has the converse meaning and denotes materials having the property of diffusing effectively through the colloid layers of the photographic elements in an alkaline medium in the presence of "nondiffusing" materials. "Mobile" has the same meaning.

In the preferred embodiment, the film unit is an integral film unit wherein the receiver, dye-forming layer and cover sheet are permanently attached to one another before, during and after processing.

The resulting mordant layer in the image transfer film unit comprises metal ions chelated to the polymer and to the dye or dye-forming material.

The following examples are presented for a further understanding of the invention.

EXAMPLE 1

Part A

To a 104-gram sample of 9.6 percent poly(divinylbenzene-co-styrene-co-N-benzyl-N,N-dimethyl-N-vinylbenzylammonium chloride) mordant in water was added 1 g of bis(methacryloyloxyethyl) malonate. The mixture was stirred for 6 hours under nitrogen, after which 1 ml of 10 percent ammonium persulfate solution $(NH)_2S_2O_8$ was added and the mixture stirred for 24 hours at 60° C. under nitrogen.

Part B

Metallization of particles prepared in A above.

A sample of material prepared in A was adjusted to pH=10-10.5 with 0.25 N NaOH, then treated with 1.5 equivalents (based on β-diester) of $Cu(Acetate)_2$ as a 10 percent aqueous solution. The sample was then dialyzed for 8 hours against distilled water to a pH=6-6.5. After filtration, the pH was readjusted to 10-10.5 with 0.25 N NaOH.

The above was repeated with chelating monomers, including 2-acetoacetoxyethyl methacrylate, 6-(m- and p-vinylphenyl)-2,4-hexanedione, m- and p-vinylbenzyliminodiacetic acid and 4-(methacryloyloxymethyl)-2,6,7-trioxa-1-phosphabicyclo[2,2,2]octane.

EXAMPLE 2

Part A

A 250-gram sample of 9.4 percent polymeric mordant as in Example 1 in water was treated with 7.05 g of vinylbenzyl chloride under nitrogen. After stirring for 2 hours, the mixture was heated to 60° C. and treated with 1 ml of 10 percent $(NH_4)_2S_2O_8$. Stirring was continued for 24 hours at 60° C. under nitrogen.

Part B

To an 81-gram sample of material from Part A was added a solution of 3.9 g of disodium iminodiacetic acid and 5.8 g of $Ni(NO_3)_2.6H_2O$ in 25 ml of water. With mechanical stirring, the pH was adjusted to 11.5 with Triton B (trimethylbenzylammonium hydroxide). Stirring was continued for 6 hours, after which the material was dialyzed for 18 hours against distilled water.

Part C

As an alternative method to Part B, the poly(vinylbenzyl chloride) encapsulated mordant can be treated with a solution of the iminodiacetic acid salt at high pH, followed by subsequent metallization.

EXAMPLE 3

Part A

Preparation of reactive latex.

To a 2-liter, 4-neck flask was charged 1000 ml of distilled water. The water was heated to 90° C. and stirred under a nitrogen purge for 20 minutes, then cooled to 60° C. To the water was added 6.0 g of a surfactant Triton X-100 (an octylphenoxy polyethoxy ethanol surfactant supplied by Rohm and Haas Company), 10.0 g of sodium styrenesulfonate, 189 g of vinylbenzyl chloride and 1.0 g of divinylbenzene. The mixture was stirred rapidly under nitrogen for 10 minutes, after which 2.0 g of $(NH_4)_2S_2O_8$ was added. Stirring was continued for 4 hours at 60° C., after which an additional 0.5 g of $(NH_4)_2S_2O_8$ and 0.3 g of $Na_2S_2O_5$ were added, and the temperature increased to 90° C. for 1.5 hours. After cooling, the latex was filtered and dialyzed against distilled water.

Part B

Reaction of reactive latex with chelating group.

A 100-gram sample of poly(vinylbenzyl chloride-co-divinylbenzene-co-sodium p-styrenesulfonate) (weight ratio 94.5/0.5/5) from Part A was treated with one equivalent (based upon vinylbenzyl chloride) of disodium iminodiacetic acid dissolved in 75 ml of water. The mixture was stirred for 48 hours at pH=10, then dialyzed against distilled water for 6 hours.

Part C

Metallization of chelating latex.

To a 50-gram sample of the material prepared in Part B was added a solution of 12.3 g of $Ni(NO_3)_2.6H_2O$ in 25 ml of water. The mixture was stirred for one hour, then dialyzed for 18 hours against distilled water.

EXAMPLE 4

Part A

A 2.9 percent aqueous gelatin composition containing gelatin, TX-100 spreading agent and the encapsulated metallizing mordant of Example 1 (bis(methacryloyloxyethyl) malonate/$Cu^{+2}$) prepared by a procedure analogous to that described in Example 1 was coated on poly(ethylene terephthalate) support and dried. One square foot of the coating contained 400 mg of gelatin and 430 mg of the encapsulated metallizing mordant, including 18 mg of $Cu^{+2}$. A protective gelatinous overcoat containing the hardener bis(vinylsulfonylmethyl) ether was applied onto the mordant layer.

Part B

Three separate poly(ethylene terephthalate)-supported gelatinous coatings were prepared, each of which contained 40 mg/ft$^2$ of the metallizable dye A(1), B(2), and C(3), respectively. The coatings were protected by a thin gelatin overcoat.

One sample of each of the three coatings was brought into face-to-face contact for 2 minutes with samples of the mordant containing coating described in Part A in the presence of an alkaline processing fluid(4) to allow the dyes to migrate to the mordant. Upon separation, the mordant containing samples (now dyed) were briefly washed with water to remove excess processing fluid, then dried, and tested as described in Part C below.

Part C

The appropriately dyed mordant samples were relaminated in the presence of the alkaline processing fluid described in Part B against a cover sheet consisting of a supported layer of the polymer acid[5] to simulate the short-interval, high pH condition followed by shutdown to an acidic condition, as is encountered during and subsequent to the processing of a typical color-image transfer unit. These laminates were sealed and submitted for the fading test described below.

High-Intensity Daylight Fading Test (HID)

After having been subjected to a three-day HID test[6], the cyan dye A had lost only 8 percent of its initial density relative to a loss of 16 percent by the same dye tested under identical conditions after its transfer to an unmetallized encapsulated mordant. The magenta dye B on the metallized mordant encountered no loss in density relative to the loss of 77 percent of the initial dye density by the same dye transferred to the unmetallized encapsulated mordant. The yellow dye C was equally stable (no density loss) on the metallized and the unmetallized mordant.

APPENDIX (1) Cyan Dye A

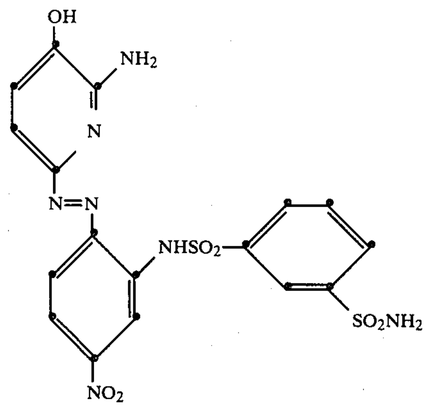

(2) Magenta Dye B

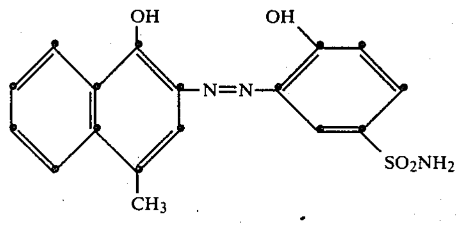

(3) Yellow Dye C

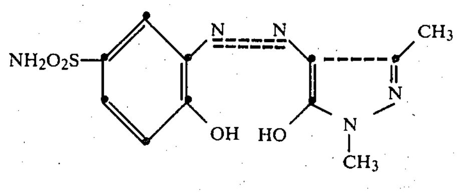

(4) Alkaline Processing Fluid:

| | | |
|---|---|---|
| Pod contains: | 46.8 g/l KOH<br>51.0 g/l CMC | (Part B, Example 3) |
| Pod for wet light fade contains: | above, and 12.0 g/l MOP | |

(5) Polymeric Acid

30:70 Butyl acrylate-acrylic acid polymer (6) HID Test:

Power for this test is a 6,000-watt, water-cooled, High Intensity Daylight, Xenon Arc lamp, filtered by ¼-inch plate glass. The illuminance at the sample plane, which is 18 inches removed from power, is 50,000 lux. Temperature in sample cabinet is 100° F±5°, and the relative humidity is ~15 percent.

EXAMPLE 5

This example describes the stability which is attainable by mordanting "conventional", i.e., non-metallizable, dyes to an encapsulated metallizing mordant of this invention.

The cyan dye[7] showed no loss in density in the above-described three-day fading test when held by the metallizing mordant, versus a 17 percent density loss when held by the non-metallizing mordant. The compositions of the coatings, as well as their processing and testing, were analogous to those described in Example 3.

APPENDIX (7) Cyan Dye

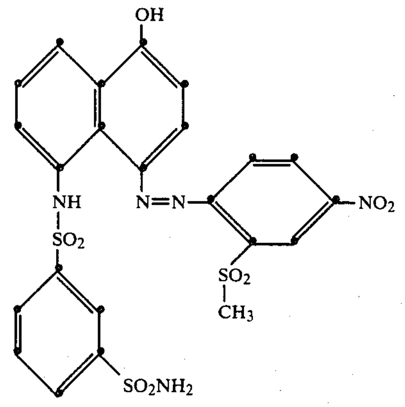

The invention has been described in detail with particular reference to preferred embodiments thereof, but it will be understood that variations and modifications can be effected within the spirit and scope of the invention.

What is claimed is:

1. A photographic element comprising a support having thereon a dye mordant containing-layer containing a hydrophilic vehicle having dispersed therein a non-metal chelating particulate polymeric material encapsulated with a member of the group consisting of a chelating polymer having associated therewith a source of metal ions and a metal chelated with a chelating polymer.

2. The element of claim 1 wherein the particulate polymeric material is encapsulated with a chelating polymer and said layer further contains metal ions.

3. The photographic element of claim 2 wherein said chelating polymer is derived from a monomer selected from the group consisting of β-diesters having the formula:

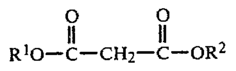

wherein $R^1$ and $R^2$ are independently selected from the group consisting of ethylenically unsaturated groups, alkyl, aryl, cycloalkyl and heterocyclic groups, wherein at least one of $R^1$ and $R^2$ is an ethylenically unsaturated group; β-diketones having the formula:

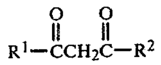

wherein $R^1$ and $R^2$ are independently selected from the group consisting of ethylenically unsaturated groups, alkyl, aryl, cycloalkyl and heterocyclic groups, wherein at least one of $R^1$ and $R^2$ is an ethylenically unsaturated group; β-ketoesters having the formula:

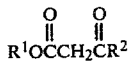

wherein $R^1$ and $R^2$ are independently selected from the group consisting of ethylenically unsaturated groups, alkyl, aryl, cycloalkyl and heterocyclic groups, wherein at least one of $R^1$ and $R^2$ is an ethylenically unsaturated group; dicarboxylic acids having the formula:

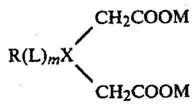

wherein R is an ethylenically unsaturated group; L is a divalent linking group; M is hydrogen, alkali metal or an ammonium cation; m is 0 or 1; and X is N or CH; dinitriles having the formula:

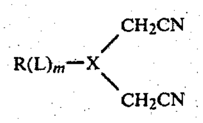

wherein R is an ethylenically unsaturated group; L is a divalent linking group; m is 0 or 1; and X is N or CH; diamines having the formula:

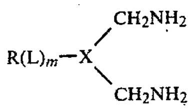

wherein R is an ethylenically unsaturated group; L is a divalent linking group; m is 0 or 1; and X is N or CH; diamines having the formula:

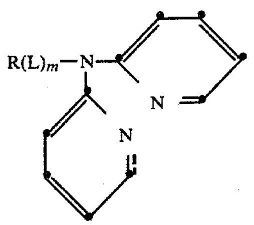

wherein R is an ethylenically unsaturated group; L is a divalent linking group; m is 0 or 1; and X is N or CH; and phosphites having the formula:

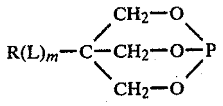

wherein R is an ethylenically unsaturated group; L is a divalent linking group; m is 0 or 1; and X is N or CH.

4. The photographic element of claim 1 wherein the particulate polymeric material is a mordant for dyes.

5. A photographic element comprising a support having thereon a dye mordant containing-layer containing a hydrophilic vehicle having dispersed therein a non-metal chelating particulate polymeric material encapsulated with a metal chelated with a chelating polymer.

6. A dye image-receiving element comprising a support having thereon a dye mordant containing-layer containing a hydrophilic vehicle having dispersed therein a non-metal chelating particulate polymeric material encapsulated with a member selected from the group consisting of a chelating polymer having associated therewith a source of metal ions and a metal chelated with a chelating polymer.

7. A photographic element comprising a dye mordant containing-layer containing a hydrophilic vehicle having dispersed therein a non-metal chelating particulate polymeric dye mordant encapsulated with a metal chelated with a chelating polymer and containing a dye or dye-forming material, imagewise.

8. The element of claim 7 wherein the metal is chelated by the dye or dye-forming material and by said polymer.

9. A complex comprising metal coordinated to a dye and to the encapsulating polymer of a non-metal chelating particulate polymeric dye mordant encapsulated with a chelating polymer.

* * * * *